US005629274A

United States Patent [19]
Hayakawa et al.

[11] Patent Number: 5,629,274
[45] Date of Patent: *May 13, 1997

[54] LUBRICATING FLUID COMPOSITION FOR DYNAMIC PRESSURE BEARING

[75] Inventors: Masamichi Hayakawa; Toshihiro Kobayashi, both of Shimosuwa-machi; Kazuya Shimizu, Fujisawa; Yuusuke Matsumura, Tokyo; Masuhiro Onoyama, Isehara; Katsumi Nagano, Chita, all of Japan

[73] Assignees: Sankyo Seiki Mfg. Co., Ltd., Nagano; Taiho Industries Co., Ltd., Tokyo, both of Japan

[*] Notice: The term of this patent shall not extend beyond the expiration date of Pat. No. 5,627,147.

[21] Appl. No.: 622,246

[22] Filed: Mar. 25, 1996

[30] Foreign Application Priority Data

Mar. 25, 1995 [JP] Japan .................................. 7-091548
Mar. 25, 1995 [JP] Japan .................................. 7-091550

[51] Int. Cl.$^6$ .................................................. C10H 105/38
[52] U.S. Cl. ...................... 508/485; 508/501; 252/62.52; 252/62.54
[58] Field of Search ........................ 252/12.2, 26, 62.52, 252/62.54; 508/485, 501

[56] References Cited

U.S. PATENT DOCUMENTS

| 3,726,574 | 4/1973 | Tuffias et al. ...................... 308/36.3 |
| 5,290,464 | 3/1994 | Fisicaro et al. ....................... 252/52 R |
| 5,505,869 | 4/1996 | Berti et al. ............................. 252/56 R |

*Primary Examiner*—Jacqueline V. Howard
*Attorney, Agent, or Firm*—Oblon, Spivak, McClelland, Maier & Neustadt, P.C.

[57] ABSTRACT

A lubricating fluid composition for dynamic pressure bearings which supports a shaft by dynamic pressure, said lubricating fluid composition comprising fine magnetic particles dispersed in a base oil solvent, to which solvent is added an amine anti-gelling agent.

17 Claims, No Drawings

LUBRICATING FLUID COMPOSITION FOR DYNAMIC PRESSURE BEARING

BACKGROUND OF THE INVENTION

1. Field of the Invention

The present invention relates to a lubricating fluid composition for dynamic pressure bearings, which fluid supports the shaft of the bearing by dynamic pressure, and to the magnetic characteristics of the fluid which are utilized for sealing action.

2. Description of the Background

In recent years, attention has been directed to the bearing component of such devices as motors by which various kinds of rotating members such as a polygon mirror, magnetic disc, optical disc, and the like are rotated at high speed. Attention has been directed to the use of a magnetic lubricating fluid as a lubricating fluid for the dynamic pressure bearing. That is, a magnetic fluid is a colloidal solution in which fine ferromagnetic particles are stably dispersed in a liquid solvent. In view of the strong ferromagnetic property which the liquid itself shows, the fluid is usually used as a sealant in combination with ball bearings in many cases. However, dynamic pressure bearings which use the magnetic fluid as a lubricating fluid of the bearing have great prospects, because the dynamic pressure bearing is superior in high speed rotation stability and stillness, and the like, in comparison to ball bearings. Dynamic pressure bearings provided with a magnetic fluid have been proposed and have great prospects. Dynamic pressure bearings provided with a magnetic fluid have been proposed and disclosed in, for example, Japanese Laid-Open Patent Application No. 88223/1985, which discloses a device having a fluid which acts as both a lubricating fluid for generating dynamic pressure and a magnetic fluid for magnetic sealing.

A magnetic fluid composition has been used in the past for sealing purposes, because of its most important property for a sealing, which is its most noteworthy property, which is that of high sealing at pressures of $10^{-6}$ Torr under high speed rotation conditions. However, a magnetic fluid composition which simultaneously satisfies both functions as a lubricating fluid and a sealing magnetic fluid (low abrasion characteristics and good lifetime characteristics of low volatility and high temperature resistance) has not yet been developed (see PETROTECH, vol. 13, No. 12 (1989)).

However, in such a device as mentioned above, the magnetic fluid composition must have both a low volatility as a seal and a low viscosity for lowering bearing loss. That is, the bearing portion of a device is exposed to far greater shearing stress and higher temperature than the sealing portion of a bearing device. Sometimes, active metal surfaces are formed by metal-metal contact and wear in the bearing, particularly at starting or stopping of a bearing containing device, with which the fluid comes into contact.

Thus, there is a need for a lubricating fluid composition for dynamic pressure bearings, which achieves not only high sealing properties, but also high lubricity and long lifetime characteristics. More specifically, the characteristics which should be possessed by a lubricating fluid composition for use as both a lubricating fluid for dynamic pressure generation and a magnetic fluid for sealing, are:

1) a low viscosity of 100 CP or less (at 27° C.),
2) a saturation magnetization of 50 gauss or more,
3) low volatility which can maintain sealing characteristics,
4) high temperature gelation resistance, oxidation resistance, and the like. (The fluid exhibit stability while suppressing these factors.) and
5) restrain the activity of active surface metal caused by contact or wear of metal surfaces.

A magnetic fluid satisfying these characteristics has not yet been obtained. Above all the lifetime characteristics of the magnetic lubricant fluid, the phenomenon of so-called gelation, in which fluidity is lost, particularly at high temperatures, is a serious problem which needs to be solved.

It has been known to add 0.1 to 0.5% by weight of a phenolic, amine or sulfur containing antioxidant to a lubricating oil in order to improve the effective lifetime of the fluid. However, nothing has been known as to what kind of material(s) could be added to the fluid in what kind of manner, to prevent gelation of a magnetic fluid. Japanese Laid-Open Patent Application No. 105093/1984, discloses that an antioxidant can be added to the fluid in order to prevent deterioration of the magnetic fluid by oxidation, but there is no disclosure about prevention of gelation. A need therefore continues to exist for a magnetic fluid which exhibits superior properties, particularly superior gelation resistance.

SUMMARY OF THE INVENTION

Accordingly, the object of the present invention is to provide a lubricating fluid composition for dynamic pressure bearings which is resistant to gelation and whose lifetime reliability can be improved over long periods of time.

Briefly, this object and other objects of the present invention as hereinafter will become more readily apparent can be attained by a lubricating fluid composition for dynamic pressure bearings which comprises a fluid containing fine magnetic particles dispersed in a base oil solvent of an amine anti-gelling agent dissolved in a base oil.

DETAILED DESCRIPTION OF THE PREFERRED EMBODIMENTS

As a result of research leading to this invention, it has been found that in view of the complexity in structure of a magnetic fluid, particularly in view of its interaction with a surfactant, the action of antioxidant added to a magnetic fluid is different from that which is added to a lubricating agent in general. Further, when a specific kind of antioxidant is added to a magnetic fluid, its gelation can be sufficiently prevented. Still further, in order to obtain a sufficient gelation prevention effect in a lubricating fluid composition for dynamic pressure bearings, it is necessary for the antioxidant to exhibit:

1) a solubility in the base oil and not precipitate from the fluid even when a magnetic fluid is prepared by incorporation of a surfactant therein,
2) a diminished ability to increase in viscosity;
3) a low volatility weight loss, and
4) a resistance to precipitation as a reaction product from the fluid.

It has been found that desirably good characteristics can be obtained by a fluid of relatively simple structure, where the fluid is applied as both a lubricating fluid for dynamic pressure generation and for magnetic sealing, and improves the lifetime and reliability of a magnetic bearing device.

Also, by using a base oil solvent containing a dialkyl carbonate; ROCOOR, wherein R represents a $C_{5-20}$ alkyl group, physical properties such as viscosity, volatility loss, high temperature gelation, and the like can be improved. Further, by adding an anti-gelling agent, a viscosity temperature index improving agent and a metal inactivating agent to the fluid, characteristics particularly such as viscosity, high temperature gelation, and the like can be markedly improved.

In the present invention, the amine anti-gelling agent may be an amine antioxidant.

Moreover, in the base oil solvent, besides the presence of said dialkyl carbonate (ROCOOR), a hydrogenated poly-α-olefin (PAO) may be present. The base oil solvent may also contain a viscosity index improving agent, as well as a metal inactivating agent.

Suitable amine anti-gelling agents include aminic anti-oxidants such as alkyldiphenylamine (trade name: Irganox L01, L57, L06, etc.) and phenyl-α-naphthylamine (trade name: Irganox L05, etc.).

As stated supra, the base oil solvent of the present lubricating fluid may contain a dialkyl carbonate ROCOOR, wherein R represents a $C_{5-20}$ alkyl group. Suitable such dialkyl carbonates are those obtained by the interesterification reaction of dimethyl carbonate [$(CH_3O)_2CO$] and a $C_{5-20}$ monovalent alcohol (ROH). Suitable viscosity characteristics of the dialkyl carbonate range from about 6.3 to 17.5 cst (at 40° C.) (produced by Mitex K.K., trade name: DIALCARB H2, DIALCARB SR1000/R, etc.). However, the dialkyl carbonate must have good volatility.

Further, the base oil may be a mixture of dialkyl carbonate (ROCOOR) and a hydrogenated poly-α-olefin. The hydrogenated poly-α-olefin can be obtained, for example, by hydrogenating a polymerized material obtained by polymerizing 1-decene, isobutylene, or the like with an acid such as a Lewis acid. Poly-α-olefins having a number average molecular weight of about 200 to 1600 are used, but in view of such factors as volatility, and the like, a poly-α-olefin having a number average molecular weight of about 400 are preferred. Hydrogenation may not be carried out completely but, when the degree of hydrogenation is low, the resulting material is liable to deteriorate.

Furthermore, a suitable base oil solvent may comprise a mixture of a hydrogenated poly-α-olefin and a polyol ester. The polyol ester has a structure, for example, in which a polyvalent alcohol such as neopentyl glycol (NPG), trimethylolpropane (TMP), pentaerythritol (PE), or the like reacts with a long chain or branched aliphatic acid having a carbon number of 5 to 18. Also, various trimethylolpropane-based-mixed esters of the formula:

$CH_3CH_2$—C—$(CH_2OOCR)_3$ in which R is a $C_{5-20}$ alkyl group, may be used. More specifically, a mixed trimethylolpropane ester of valeric acid and heptanic acid (produced by Shin-nittetsu Kagaku K.K.; trade name: HATCOL 2915, 2925, 2937, etc.) or a mixed ester oil of trimethylolpropane with decanoic acid or heptanic acid (produced by Shin-nittetsu Kagaku K.K.; trade name: HATCOL 2938, etc.) is particularly preferred.

The formulation ratio of all components of the composition based on 100 parts by weight of the base oil solvent, is preferably 1 to 15 parts by weight of the aminic anti-gelling agent, wherein the viscosity is preferably 100 cp or lower level of 150 gauss, while if it exceeds 35 parts by weight, the viscosity increases. Also, various additives such as rust preventives, viscosity index improving agents, metal inactivating agents, and the like may be added to the base oil solvent which is the same as for lubricating oils.

Having generally described this invention, a further understanding can be obtained by reference to certain specific examples which are provided herein for purposes of illustration only and are not intended to be limiting unless otherwise specified.

Examples of the magnetic fluid composition, which constitutes the bearing lubricating fluid used as the dynamic pressure bearing component according to the present invention are as follows:

In the following examples, the fine magnetic particles of Mn-Zn ferrite are obtained by the coprecipitation method and have a saturation magnetization of 250 gauss.

The fine magnetic particles are prepared by dissolving 0.1 mol of manganese sulfate, 0.4 mol of zinc sulfate and 0.5 mol of ferric sulfate in one liter of water, adding dropwise 6N sodium hydroxide to the aqueous solution while maintaining the temperature at 90° C. with stirring to reach a pH 11, whereby a colloid of Mn-Zn ferrite is formed. The liquid temperature is adjusted to 80° C., and 250 ml of a 10% sodium oleate solution is added to the mixture with stirring. After cooling the mixture to room temperature, aqueous 3N hydrochloric acid solution is added until a pH 6 is reached. Coagulated colloid particles are washed with water sufficiently and dried, thereby obtaining fine Mn-Zn ferrite particles coated with oleic acid.

Then, 14.8 g of the fine Mn-Zn ferrite particles coated with oleic acid are taken from the resulting particles and 15 g of the following base oil are added thereto. After dispersing the particles by sufficient stirring, undispersed material is removed by centrifugation and the base oil is added until a specific gravity of 1.16 is reached for the fluid obtained. The ferrite concentration of the thus obtained fluid is 35 wt. % and the saturation magnetization is 250 gauss.

Further, the base oil solvent for dispersing the fine Mn-Zn ferrite particles is a mixture of dialkyl carbonate (ROCOOR), wherein R is a $C_{5-20}$ alkyl group (produced by Mitsui Sekiyu Kagaku K.K., DIALCARB SR1000/R), a hydrogenated poly-α-olefin [C30 to C40] (Shinflude 401, produced by Shin-nittetsu Kagaku K.K.), diisodecyl adipate oil (HATCOL 2910, produced by Shin-nittetsu Kagaku K.K.) and trioctyl trimellitate oil (HATCOL 2920, produced by Shin-nittetsu Kagaku K.K.). Further, an amine antioxidant is added to the mixture as an anti-gelling agent, specifically alkyldiphenyl amine (Irganox L57, trade name). By variously changing the amount of the alkyldiphenyl amine as the anti-gelling agent as shown in Table 1, the lubricating fluid compositions of Examples 1 to 4 and Comparative Examples 1 to 5 were prepared.

TABLE 1

| Sample/Kind of anti-oxidant | Comparative Example 1 | Example 3 | Example 4 | Example 1 | Example 2 | Comparative Example 2 | Comparative Example 3 | Comparative Example 4 | (wt. %) Comparative Example 5 |
|---|---|---|---|---|---|---|---|---|---|
| Alkyldiphenyl amine (L57) | — | 0.1 | 0.5 | 0.1 | 0.5 | — | — | — | — |
| 2,6-Di-t-butyl-phenol (L108) | — | — | — | — | — | 0.5 | 5.0 | — | — |
| 4,4'-Thiobis (2-t-butyl-4-methyl phenol; L115) | — | — | — | — | — | — | — | 0.5 | 5.0 | and the saturation magnetization is preferably 150 gauss or more. If the amount of the fine magnetic particles is less than 25 parts by weight, the resulting material does not reach a The obtained lubricating fluid compositions were each placed in a petri dish and evaluated for stabilities of the dispersed state by observing appearances such as the presence or absence of precipitation, aggregation, separation, and the like. Further, each composition was allowed to stand at a temperature of 80° for 520 hours and the volatility weight loss was measured. Moreover, the gel time was measured for each composition at a temperature of 140° C. As for the viscosity, the viscosity and viscosity temperature index at 25° C. were determined. The results are shown in Table 2.

high temperature gelation preventive effect (effect of antioxidation) could be obtained. For example, in the composition of Comparative Example 2, wherein the amount of 0.5% by weight of 2,6-di-t-butylphenol (trade name; Ethyl 701, Irganox L108, etc.) was added as a phenolic anti-gelling agent (antioxidant) or in that of Comparative Example 4, wherein the amount of 0.5% by weight of 4,4'-thiobis(2-t-butyl-4-methylphenol (L115)) was added as

TABLE 2

| Sample/Kind of anti-oxidant | Comparative Example 1 | Example 3 | Example 4 | Example 1 | Example 2 | Comparative Example 2 | Comparative Example 3 | Comparative Example 4 | (wt. %) Comparative Example 5 |
|---|---|---|---|---|---|---|---|---|---|
| Dispersion stability (precipitation etc.) | o | o | o | o | o | o | x | o | x |
| Viscosity cp at 25° C. | 60 | 60 | 62 | 63 | 64 | 61 | — | 64 | — |
| Volatility weight loss (wt. %) | 0.89 | 0.89 | 0.91 | 0.92 | 1.12 | 1.17 | — | 0.91 | — |
| Gelation preventive effect (antioxidation lifetime) | 100 | 150 | 180 | 300 | 500 | 100 | — | 100 | — |

In Table 1, Comparative Example 1 contains no anti-gelling agent, while small amounts of aminic antioxidants, as an anti-gelling agent, were added in the compositions of Example 3 and Example 4. That is, an aminic antioxidant (anti-gelling agent), of 0.1% by weight of alkyldiphenyl amine (L57) was added to the composition of Example 3 and, in Example 4, 0.5% by weight of alkyldiphenyl amine (L57) was employed. Thus, when a small amount of the aminic antioxidant (anti-gelling agent) is present, as shown in Table 2, improvement in the characteristics of viscosity and volatility weight are not significant, but a high temperature gelation preventive effect (effect of antioxidation) can be slightly observed. That is, the high temperature gelation preventive effect of Comparative Example 1 is 100, but the values of Example 3 and Example 4 are 150 and 180, respectively. This effect is believed the attributable to the interactive effect of the amine antioxidant, as the amine anti-gelling agent, and a surfactant. Also, when the amine antioxidant (anti-gelling agent) was added exceeding an amount of 0.5% by weight, it was found that the characteristics of viscosity, volatility weight loss and high temperature gelation preventive effect were all improved as described hereinafter.

Further, in the magnetic fluid compositions of Example 1 and Example 2, the amine anti-gelling agent (antioxidant), specifically alkyldiphenyl amine (L57), in amounts of 1.0% by weight and 5.0% by weight thereof were added, respectively. Thus, in Example 1 and Example 2, to each of which a large amount of the amine anti-gelling agent (amine antioxidant) was added, each of the characteristics of viscosity, volatility weight and high temperature gelation preventing effect (antioxidation lifetime) showed preferred values. In particular, an improved high temperature gelation preventing effect (antioxidation effect) was observed for Example 1 (at the value of 300). The high temperature gelation preventing effect of Example 2 shows remarkable improvement at 500. Thus, it was found that the high temperature stability of the magnetic fluid compositions to which a large amount of the amine anti-gelling agent (amine antioxidant) was added is excellent.

On the other hand, when a small amount of an anti-gelling agent (antioxidant), other than the amine type, was added, no a sulfur containing anti-gelling agent (antioxidant), improvement in viscosity and volatility weight is not very noticeable, particularly no improvement was definitely observed in the high temperature gelation preventive effect (effect of antioxidation). That is, for the high temperature gelation preventive effect, there was no change in comparison to Comparative Example 1, wherein no anti-gelling agent (antioxidant) was added.

Further, in Comparative Example 3 or Comparative Example 5, where another type of anti-gelling agent than the amine type anti-gelling agent was added in a large amount (5.0% by weight), fine ferromagnetic particles could not be dissolved in a liquid dispersion solvent, whereby no magnetic fluid composition could be obtained.

In the above examples, the examples of the invention use an amine anti-gelling agent (antioxidant) alone added to the base oil solvent in a predetermined amount. However, an amine anti-gelling agent can be used in combination with a phenolic anti-gelling agent (antioxidant) or a sulfur containing anti-gelling agent (antioxidant). For example, such combined formulation preferably uses 1 to 10 parts by weight of the amine antioxidant and 1 to 10 parts by weight of the phenol antioxidant based on 100 parts by weight of the base oil solvent in view of solubility, and the like. The phenol antioxidant is effective only when it is used in combination.

As mentioned above, by adding the amine anti-gelling agent to the base oil solvent, the resulting lubricating fluid composition for dynamic pressure bearings of the present invention can markedly improve physical properties, particularly high temperature gelation, while maintaining good viscosity and volatility weight characteristics.

Other examples of the present invention and Comparative Examples are as follows:

First, a base oil solvent for dispersing fine magnetic particles of Mn-Zn ferrite, is a combination of a dialkyl carbonate (ROCOOR), where R is a $C_{5-20}$ alkyl group (produced by Mitsui Sekiyu Kagaku K.K., DIALCARB SR1000/R), a hydrogenated poly-α-olefin [$C_{30}$ to $C_{40}$] (Shinflude 401, produced by Shin-nittetsu Kagaku K.K.), diisodecyl adipate oil (HATCOL 2910, produced by Shin-nittetsu Kagaku K.K.) and trioctyl trimellitate oil (HATCOL 2920, produced by Shin-nittetsu Kagaku K.K.). To the mixture was added an anti-gelling agent (alkyldiphenyl amine/Irganox L57, trade name), a viscosity index improving agent (OLICAT-M, produced by OSWALD BOLL CO.), and a metal inactivating agent (Reomet 39, produced by Ciba Geigy AG), thereby producing lubricating fluid compositions.

By changing the ratio of each element in the base oil solvent as shown in Table 3 infra, lubricating fluid compositions of Examples 5 to 8 and Comparative Examples 6 to 9 were prepared.

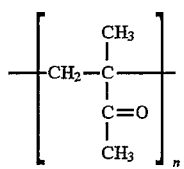

The average molecular weight of the above-identified material is 5,000 to 300,000, but those using a hydrogenated

TABLE 3

| Sample | Example 5 | Example 6 | Comparative Example 6 | Comparative Example 7 | Comparative Example 8 | Comparative Example 9 | Example 7 | (wt. %) Example 8 |
|---|---|---|---|---|---|---|---|---|
| Poly α olefin PA0401 | — | Bal | — | — | Bal | Bal | — | — |
| Dialkyl carbonate SR 1000 | Bal | 50 | — | — | — | — | Bal | Bal |
| Diester H2910 | — | — | Bal | — | 50 | — | — | — |
| Triester H2920 | — | — | — | Bal | — | 50 | — | — |
| Anti-oxidant | 5 | 5 | 5 | 5 | 5 | 5 | 5 | 5 |
| Viscosity temperature index improving agent | 5 | 5 | 5 | 5 | 5 | 5 | 5 | — |
| Metal inactivating agent | 0.05 | 0.05 | 0.05 | 0.05 | 0.05 | 0.05 | 0.05 | — |

In Table 3, "Bal" indicates that the remaining balance of a composition is constituted of the "Bal" ingredient.

The viscosity temperature index improving agent preferably is a polymethacrylate having the formula:

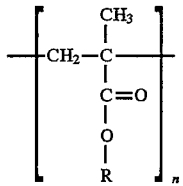

The average molecular weight of the above-identified agent is 20,000 to 1,500,000, but in view of the relationship between the viscosity index improving effect and shear stability, those polyesters having an average molecular weight in the range of 20,000 to 50,000 are preferred. Also, these polymers are difficult to handle during production and formulation. Thus, they are generally diluted with a low viscosity mineral oil. However, the use of a low viscosity mineral oil introduces problems in volatility, dispersion stability, and the like of the fluid, with the consequence that it is preferred to utilize a hydrogenated poly-α-olefin as a diluent.

Further, the viscosity temperature index improving agent preferably is a polybutene (polyisobutylene type) having the formula:

poly-α-olefin as a diluent are preferred for the same reasons mentioned above.

The metal inactivating agent component is a benzotriazole or a derivative thereof. However, imidazoline and pyrimidine derivatives may also be used. Many of these materials, which have an inactivating effect, exist as compounds which have an N—CN bond structure and have both the action of forming an inactive film on the surface of the metal and an antioxidant action. Besides these compounds, another compound which has a N—C—S bond structure is suitable. However, in view of solubility in a base material and volatility, etc., benzotriazole derivatives (for example, Reomet 38, 29, SBT) are used.

The prepared lubricating fluid compositions, as shown in Table 3, were each placed in a petri dish and the stabilities of the dispersed state of the fine magnetic particles therein were determined by observing the appearance of the presence or absence of precipitation, aggregation, separation, and the like. These determinations were made in the same way as discussed above. Further, each composition was allowed to stand at a temperature of 80° C. for 520 hours and the volatility weight loss was determined. Moreover, gel time was measured by allowing each composition to adjust to a temperature of 140° C. As for the viscosity, the viscosity and viscosity temperature index at 25° C. were determined to each other. The results are shown in Table 4.

TABLE 4

| Sample/ Magnetic Fluid Characteristics | Example 5 | Example 6 | Comparative Example 6 | Comparative Example 7 | Comparative Example 8 | Comparative Example 9 | Example 7 | (wt. %) Example 8 |
|---|---|---|---|---|---|---|---|---|
| Dispersion stability | o | o | x | x | o | o | o | o |
| Viscosity cp at 25° C. | 90 | 81 | — | — | 58 | 212 | 90 | 87 |
| Volatility weight loss (wt %) | 0.08 | 0.11 | — | — | 1.67 | 0.06 | 0.08 | 0.08 |
| Viscosity temperature index | 164 | 171 | — | — | 158 | 173 | 164 | 122 |
| Gelation preventive effect (antioxidation lifetime) | 300 | 280 | — | — | 140 | 300 | 290 | 290 |

In Table 4, each sample of Examples 6 and 7 showed preferred values for the characteristics of dispersion stability, viscosity, volatility loss, viscosity temperature index and high temperature gel time. Particularly, in Example 5, in which the amount of the polyol ester is increased to within the range of 70 wt. %, the high temperature gel time was very large and thus it was found that the sample had excellent high temperature stability. That is, it was found that the lubricating fluid in which the dialkyl ester or a mixture of the dialkyl carbonate and the hydrogenated poly-α-olefin is used as a base oil solvent and additives such as the anti-gelling agent, and the like, are added, showed an extremely excellent high temperature anti-gelling effect.

To the contrary, in Comparative Examples 1 and 2, in which another ester (Diester H2910 or Triester H2920) is used in an increased amount without using the dialkyl carbonate, dispersion of the fine magnetic particles was impossible. Also, in Comparative Examples 8 and 9, in which another ester is used in a smaller amount and the hydrogenated poly-α-olefin is used in a greater amount in combination, the mixture could be dispersed, but the composition exhibited unacceptable viscosity and volatility weight characteristics in Comparative Examples 8 and 9, respectively.

Further, for the sample of Example 7, formulated by removing the metal inactivating agent from Example 5, the characteristics showed good values, but the high temperature gel time was slightly diminished, and it was found that the high temperature gel time could be lengthened by addition of the metal inactivating agent.

Also, for the sample of Example 8, formulated by removing the viscosity temperature index improving agent from the sample of Example 7, the characteristics showed good values but the viscosity characteristics were slightly diminished as a matter of course, and it was found that the viscosity characteristics could be improved by the addition of the viscosity temperature index improving agent.

Finally, the entire formulation ratio of the lubricating fluid composition of the present invention preferably comprises from 40 to 50 parts by weight of dialkyl carbonate, 10 to 30 parts by weight of the hydrogenated poly-α-olefin, 10 to 20 parts by weight of the amine anti-gelling agent, 10 to 20 parts by weight of the metal inactivating agent and 25 to 35 parts by weight of the fine magnetic particles. The fluid composition has a viscosity of preferably 100 cp or less and the saturation magnetization is preferably 150 gauss or more. If the amount of the fine magnetic particles is less than 25 parts by weight, the resulting material does not reach a level of 150 gauss, while if it exceeds 35 parts by weight, the viscosity is increased.

It should also be noted that the material for the fine magnetic particles, in addition to Mn-Zn ferrite, can be Ni-Zn ferrite or magnetite. Also, any other higher fatty acid can be employed as a surfactant. Moreover, an aminic, phenolic or sulfur containing compound other than the above-mentioned antioxidant may be used as the anti-gelling agent.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A lubricating fluid composition for dynamic pressure bearings which supports a shaft by dynamic pressure, said lubricating fluid composition comprising:

fine magnetic particles dispersed in a base oil solvent selected from the group consisting of a dialkylcarbonate (ROCOOR), wherein R is a $C_{5-20}$ alkyl group, a hydrogenated poly-α-olefin (PAO) and a polyol ester, to which is added an amine anti-gelling agent.

2. The lubricating fluid composition of claim 1, wherein the amine anti-gelling agent is present in an amount of 0.5% by weight or more.

3. The lubricating fluid composition of claim 2, wherein the amine anti-gelling agent is present in an amount of 1 to 5% by weight.

4. The lubricating fluid composition of claim 1, wherein the amine anti-gelling agent is an amine antioxidant.

5. The lubricating fluid composition of claim 1, wherein the base oil solvent contains a dialkyl carbonate (ROCOOR), wherein R represents a $C_{5-20}$ alkyl group.

6. The lubricating fluid composition of claim 1, wherein the base oil solvent contains a dialkyl carbonate (ROCOOR) wherein R is a $C_{5-20}$ alkyl group, and a hydrogenated poly-α-olefin (PAO).

7. The lubricating fluid composition of claim 5, wherein the amine anti-gelling agent is an amine antioxidant.

8. The lubricating fluid composition of claim 6, wherein the amine anti-gelling agent is an amine antioxidant.

9. The lubricating fluid composition of claim 5, wherein a viscosity index improving agent is present in the base oil solvent.

10. The lubricating fluid composition of claim 6, wherein a viscosity index improving agent is present in the base oil solvent.

11. The lubricating fluid composition of claim 5, wherein a metal inactivating agent is present in the base oil solvent.

12. The lubricating fluid composition of claim 6, wherein a metal inactivating agent is present in the base oil solvent.

13. The lubricating fluid composition of claim 1, wherein the content of fine magnetic particles in the fluid ranges from 25 to 35 parts by weight, per 100 parts by weight of the composition.

14. The lubricating fluid composition of claim 1, wherein the base oil solvent comprises a mixture of a hydrogenated poly-α-olefin and a polyol ester.

15. The lubricating fluid composition of claim 14, wherein said polyol ester is the reaction product of a polyvalent alcohol and a long chain or branched $C_{5-18}$ aliphatic acid.

16. A lubricating fluid composition for dynamic pressure bearings which supports a shaft by dynamic pressure, said lubricating fluid composition comprising:

fine magnetic particles dispersed in a base oil solvent to which an amine anti-gelling agent is added, said solvent being a member selected from the group consisting of:
(i) at least one dialkylcarbonate (ROCOOR), wherein R is a $C_{5-20}$ alkyl group,
(ii) a mixture of said dialkylcarbonate (i) and a hydrogenated poly-α-olefin, and
(iii) a mixture of a hydrogenated poly-α-olefin and a polyol ester.

17. The lubricating fluid composition of claim 16, wherein said polyol ester is a trimethylolpropane-based-ester which has the formula: $CH_3CH_2-C-(CH_2OOCR)_3$, wherein R is a $C_{5-20}$ alkyl group.

* * * * *